United States Patent
Ben Chetrit et al.

(10) Patent No.: US 8,763,155 B1
(45) Date of Patent: Jun. 24, 2014

(54) TAG BASED VIEWS FOR ROLE BASED ACCESS CONTROL

(75) Inventors: Ronen Ben Chetrit, Kiriat Ono (IL); Itai Ephraim Zilbershtein, Hod-Hasharon (IL)

(73) Assignee: Avaya Communication Israel Ltd. (IL)

( * ) Notice: Subject to any disclaimer, the term of this patent is extended or adjusted under 35 U.S.C. 154(b) by 1404 days.

(21) Appl. No.: 12/029,588

(22) Filed: Feb. 12, 2008

(51) Int. Cl.
*G06F 21/00* (2013.01)
*G06F 21/62* (2013.01)
*G06F 21/60* (2013.01)
*H04L 29/06* (2006.01)

(52) U.S. Cl.
CPC ............ *G06F 21/629* (2013.01); *G06F 21/604* (2013.01); *H04L 63/10* (2013.01); *H04L 63/20* (2013.01); *G06F 2221/2141* (2013.01)
USPC ................................ 726/29; 726/4; 379/93.02

(58) Field of Classification Search
CPC ... G06F 21/604; G06F 21/62; G06F 21/6218; G06F 21/629; G06F 21/30; G06F 21/45; G06F 2221/2141; H04L 63/08; H04L 63/0876; H04L 63/10; H04L 63/101; H04L 63/102; H04L 63/104; H04L 63/105; H04L 63/20
USPC .................... 713/182; 726/4, 3, 17, 2, 27–30; 707/781, 783–785; 709/229; 379/93.02
See application file for complete search history.

(56) References Cited

U.S. PATENT DOCUMENTS

| | | | |
|---|---|---|---|
| 6,023,765 A * | 2/2000 | Kuhn | 726/4 |
| 6,460,141 B1 * | 10/2002 | Olden | 726/4 |
| 6,591,265 B1 * | 7/2003 | Erickson et al. | 1/1 |
| 6,810,363 B2 * | 10/2004 | Newman et al. | 702/187 |
| 6,928,455 B2 | 8/2005 | Dougu et al. | |
| 7,185,192 B1 * | 2/2007 | Kahn | 713/155 |
| 7,243,097 B1 * | 7/2007 | Agrawal et al. | 1/1 |
| 7,409,390 B2 * | 8/2008 | Kudoh et al. | 1/1 |
| 7,890,530 B2 * | 2/2011 | Bilger et al. | 707/781 |
| 8,131,762 B2 * | 3/2012 | Smetters et al. | 707/781 |
| 8,266,702 B2 * | 9/2012 | Naldurg et al. | 726/25 |
| 8,336,078 B2 * | 12/2012 | Dixit et al. | 726/1 |
| 2006/0120526 A1 * | 6/2006 | Boucher et al. | 380/247 |
| 2009/0165078 A1 * | 6/2009 | Samudrala et al. | 726/1 |

OTHER PUBLICATIONS

John F_Barkley; Role Based Access Control for the World Wide Web; Apr. 8, 1997; IEEE; pp. 1-11.*
Lamb P. et al., "Role-Based Access Control for e-Service Integration", downloaded from http://cups.cs.cmu.edu/soups/2006/posters/lamb-poster_abstract.pdf on Aug. 24, 2007, 2 pages.

(Continued)

*Primary Examiner* — Zachary A Davis
(74) *Attorney, Agent, or Firm* — Sheridan Ross P.C.

(57) ABSTRACT

A method of controlling access to a client over a computer network includes associating a user interface element with at least one tag and defining an access permission rule for a client, as a function of one or more tags, the function including at least one OR, NOT or inequality condition. The method further includes receiving a request of the client to access the user interface element and allowing the client to access the user interface element only if the tags of the user interface element meet the condition of the access permission rule.

19 Claims, 4 Drawing Sheets

(56) References Cited

OTHER PUBLICATIONS

Dr. Smith R., "Quantative Methods and Computer Science", Introduction to Multilevel Security-Part 1: Introduction, downloaded from http://www.cs.stthomas.edu/faculty/resmith/r/mls/m1intro.html on Aug. 27, 2007.

Ardagna C. et al., "A Comparison of Modeling Strategies in Defining XML-based Access Control Languages", downloaded from http://seclab.dti.unimi.it/Papers/Rl-4.pdf on Aug. 25, 2007, 18 pages.

The M-Tech Identity Management Suite™: "Beyond Roles: A Practical Approach to Enterprise User Provisioning", downloaded from http://www.id-synch.com/docs/beyond-roles.html on Jul. 10, 2007, 7 pages.

* cited by examiner

TAG BASED VIEWS FOR ROLE BASED ACCESS CONTROL

FIELD OF THE INVENTION

The present invention relates to access control and particularly to methods for configuring access control rules.

BACKGROUND OF THE INVENTION

For security purposes, electronic devices, such as switch boxes and other communication devices, have limited access, in order to prevent unwarranted fiddling with the settings of the device. Generally, each electronic device is configured with rules defining the users allowed to access each element of the device. When a network includes many electronic devices, the configuring of the devices with access control rules may be very complex.

U.S. Pat. No. 6,023,765 to Kuhn, issued Feb. 8, 2000, the disclosure of which is entirely incorporated herein by reference, describes use of a role based access control (RBAC) method, in which the access rules to the elements of the devices are defined for abstract "roles". Each user is associated with one or more roles and has the access permissions of the role. The use of roles avoids the need to change the configurations of devices when new users are added to a network. Another feature described in the Kuhn patent is a multi-level secure (MLS) system in which each element of each device is assigned a security level and a set of one or more categories to which it belongs. Only users having access to all the categories are allowed to access the element.

Nonetheless, the task of defining the access rules for a multi-element device or network is often very tedious, as rules have to be defined for each element. Furthermore, when new elements are added to an electronic device, for example in a software update, access rules need to be defined for these additional elements.

An article titled, "Role-Based Access Control for e-Service Integration", by Peter Lamb, Robert Power, Gavin Walker and Michael Compton, the disclosure of which is entirely incorporated herein by reference, describes using a hierarchy of permissions, such that if a role is given permission to perform a specific task, all the tasks beneath it in the hierarchy are also allowed to be performed by the role.

Various languages have been specified for defining access control rules. A comparison between several such languages appear in "A Comparison of Modeling Strategies in Defining XML-based Access Control Languages", Claudia Ardagna and Sabrina De Capitani di Vimercati, the disclosure of which is entirely incorporated herein by reference.

SUMMARY OF THE INVENTION

An aspect of some embodiments of the present invention relates to an access control system in which the access permissions of users are stated by logical functions on tags associated with protected elements. Defining the access rules in terms of tags rather than directly listing the elements allows defining rules which are applicable to new elements as they are generated.

In some embodiments of the invention, when a user attempts to access an element, the logical functions associated with the user or with roles of the user are applied to the tags of the element to determine whether the user is allowed to access the element. Alternatively, a rule compiler converts the logical rules relating to the tags into rules directly correlating the roles and elements, such as into an access table which states permissions for role/element pairs. In accordance with this alternative, when a user attempts to access an element, the decision of whether to allow the access is performed based on the directly correlating rules.

In some embodiments of the invention, at least one of the users is assigned an access function which depends on a plurality of tags, without requiring that the element be associated with all the tags included in the function. Optionally, the function of at least one of the users requires that the element is associated with at least one of a plurality of tags in the alternative.

In some embodiments of the invention, the tags are selected from a predetermined, possibly closed, list of tags. Each time an element is defined, it is associated with the tags to which it relates. Alternatively or additionally, one or more of the elements is defined as belonging to an element type, which in turn is associated with a set of tags. The tags optionally include tags relating to the security level and/or department to which the element relates. Alternatively or additionally, one or more tags relate to the function of the element and/or to its content, for example whether the element relates to infrastructure or to stations. In some embodiments of the invention, one or more tags relate to the complexity of the element. Alternatively or additionally, one or more of the tags relates to an extent that a change in the corresponding element may disrupt the operation of the system.

There is therefore provided in accordance with an exemplary embodiment of the invention, a method of controlling access over a computer network, comprising associating a user interface element with at least one tag, defining an access permission rule for a client, as a function of one or more tags, the function including at least one OR, NOT or inequality condition, receiving a request of the client to access the user interface element; and allowing the client to access the user interface element only if the tags of the user interface element meet the condition of the access permission rule.

Optionally, associating the user interface element with at least one tag comprises associating the user interface element with at least five tags. Optionally, the method includes converting the access permission rules into rules relating directly to the user interface elements without relating to the tags, by a computer program, before receiving the request to access the user interface element. Optionally, associating the user interface element with at least one tag comprises associating the user interface element with a plurality of tags and wherein defining the access permission rule comprises defining a rule relating to less than all the tags associated with the user interface element. Optionally, associating the user interface element with at least one tag comprises associating the user interface element with at least one tag selected from a predetermined closed list of tags defined before the user interface element is generated.

Optionally, associating the user interface element with at least one tag comprises associating the user interface element with a tag relating to a complexity of an element accessed by the user interface element. Optionally, associating the user interface element with at least one tag comprises associating the user interface element with a tag relating to an extent to which an incorrect change in the element may disrupt a system controlled by the element.

Optionally, associating the user interface element with at least one tag comprises associating the user interface element with an element type, which was previously associated with one or more tags.

There is further provided in accordance with an exemplary embodiment of the invention, a method of controlling access over a computer network, comprising associating a user interface element with a plurality of tags; defining an access permission rule for a client, as a function of one or more tags, but not all the tags associated with the user interface element; receiving a request of the client to access the user interface element; and allowing the client to access the user interface element only if the tags of the user interface element meet the conditions of the access permission rule.

Optionally, associating the user interface element with a plurality of tags comprises associating the user interface element with at least four tags. Optionally, associating the user interface element with a plurality of tags comprises associating the user interface element with at least one tag selected from a predetermined closed list of tags defined before the user interface element is generated. Optionally, associating the user interface element with a plurality of tags comprises associating the user interface element with at least one tag relating to a complexity of an element accessed by the user interface element.

Optionally, associating the user interface element with a plurality of tags comprises associating the user interface element with a tag relating to an extent to which an incorrect change in the element may disrupt a system controlled by the element.

There is further provided in accordance with an exemplary embodiment of the invention, a method of controlling access over a computer network, comprising associating a user interface element with a plurality of tags; defining an access permission rule for a client, as a function of one or more tags; converting the access permission rules into rules relating directly to the user interface elements without relating to the tags, by a computer program; receiving a request of the client to access the user interface element after converting the access permission rules; and allowing the client to access the user interface element only if the tags of the user interface element meet the conditions of the access permission rule.

Optionally, associating the user interface element with a plurality of tags comprises associating the user interface element with at least four tags. Optionally, defining the access permission rules comprises defining rules which depend on the tags and do not relate directly to the user interface elements.

There is further provided in accordance with an exemplary embodiment of the invention, a network management station, including a network interface; a memory storing a database associating user interface elements with respective lists of one or more tags; a rule compiler adapted to convert access rules formulated as depending on tags into access rules depending directly on identities of user interface elements; and an access controller adapted to receive access requests through the network interface and control access responsive to rules generated by the rule compiler.

Optionally, the memory stores a database which associates user interface elements with respective element types and associates element types with respective one or more tags. There is further provided in accordance with an exemplary embodiment of the invention, a network management station, comprising means for generating user interface elements of network devices; means for associating user interface elements with tags; means for defining access rules for user interface elements, as a function of their associated tags, which function may include at least one of an OR, NOT or inequality condition; means for converting defined access rules into rules relating directly to the user interface elements without relating to the tags; means for receiving access requests; and means for preventing access to user interface elements for requests which do not meet the rules relating directly to the user interface element to which the request relates.

BRIEF DESCRIPTION OF THE DRAWINGS

The present invention will now be described in the following detailed description of exemplary embodiments of the invention with reference to the attached figures. Generally, only structures, elements or parts that are germane to the discussion are shown in the figures.

DETAILED DESCRIPTION OF SOME EMBODIMENTS

Network Overview

Figure 1:
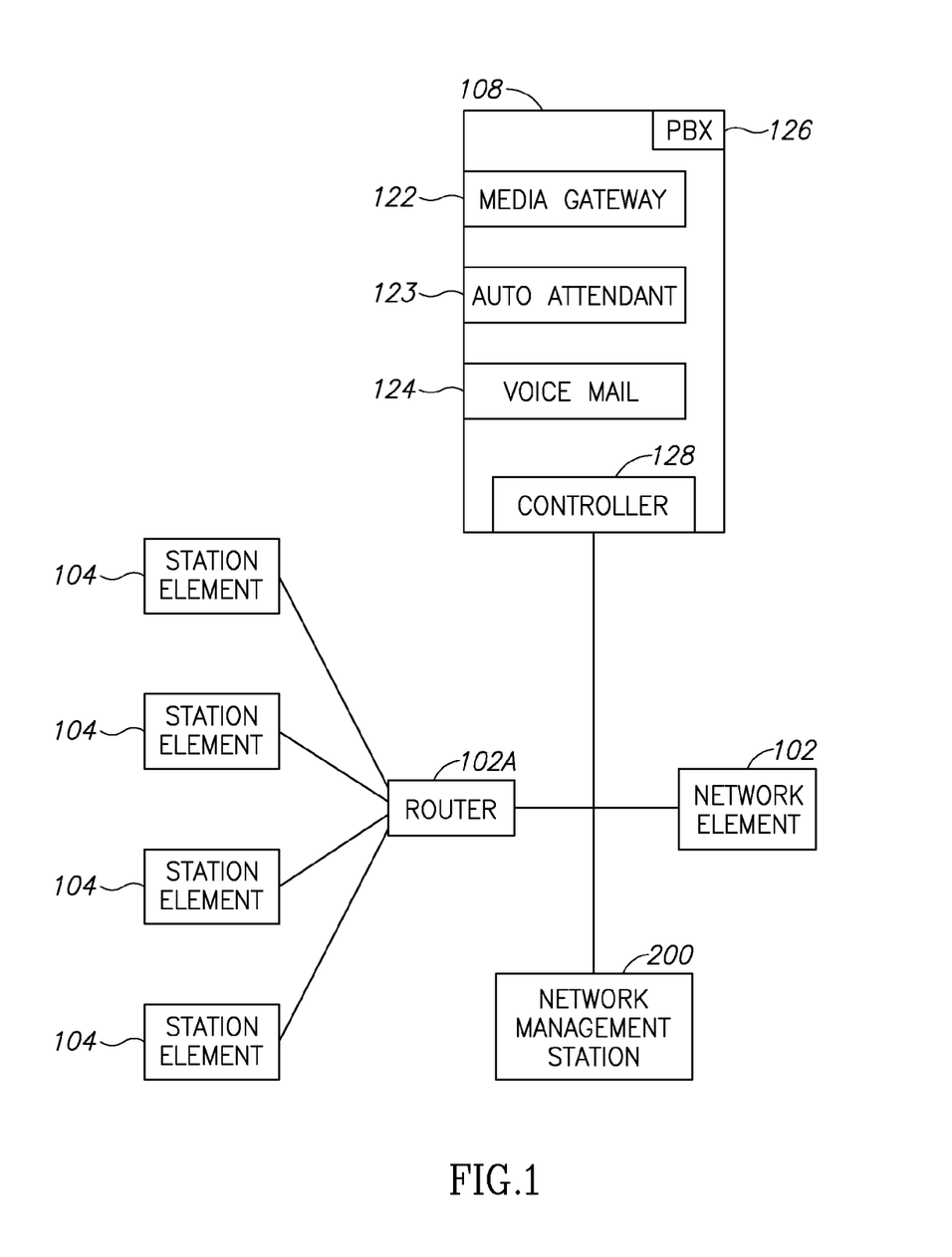
FIG. 1 is a schematic illustration of a telephony communication network, in accordance with an exemplary embodiment of the invention.

FIG. 1 is a schematic illustration of a telephony communication network 100, in accordance with an exemplary embodiment of the invention. Network 100 comprises network elements 102, such as switches and routers 102A, and station elements 104, such as IP stations, analog and/or digital stations, voice mail units and auto attendants. In some embodiments of the invention, network 100 may include an integrated multi-service telephony device 108 comprising a plurality of end sub-units, for example, a private branch exchange (PBX) 126, a media gateway 122, an automated attendant 123 and a voice mail server 124. Other elements may also be configured in accordance with embodiments of the present invention, such as stand alone telephone exchanges, e.g., private branch exchanges (PBX).

Network 100 further includes a network management station 200, which is used by maintenance and handling personnel to access the elements of network 100. Generally, each element (102, 108 or 104) of network 100 has one or more features, usually a plurality of different features, which are accessible by human operators for data retrieval and/or network configuration. Each such feature is referred to as a user interface element (UIE) and has a respective form on network management station 200, through which the UIE is accessed. Network management station 200 controls the access to these respective forms using access control procedures as are now described. Management station 200 may control the features directly, or indirectly through a controller of the element, such as illustrated by controller 128 of telephony device 108.

In some embodiments of the invention, management station 200 provides graphic user interfaces (GUIs) for configuration applications actually running on the configured elements, optionally in a web-based configuration. Alternatively, management station 200 receives the configuration information and actively configures the elements 104, which remain passive. Although management station 200 is shown as a separate unit from the configured elements 104, in some embodiments of the invention, the tasks of management station 200 are performed by local software running separately on each element (e.g., controller 128 for telephony device 108), and management station 200 is not used for some or all of the elements 104. Optionally, a user accesses the local software over the Internet or other network, using an Internet access tool (e.g., Internet explorer).

Access Control

Figure 2:
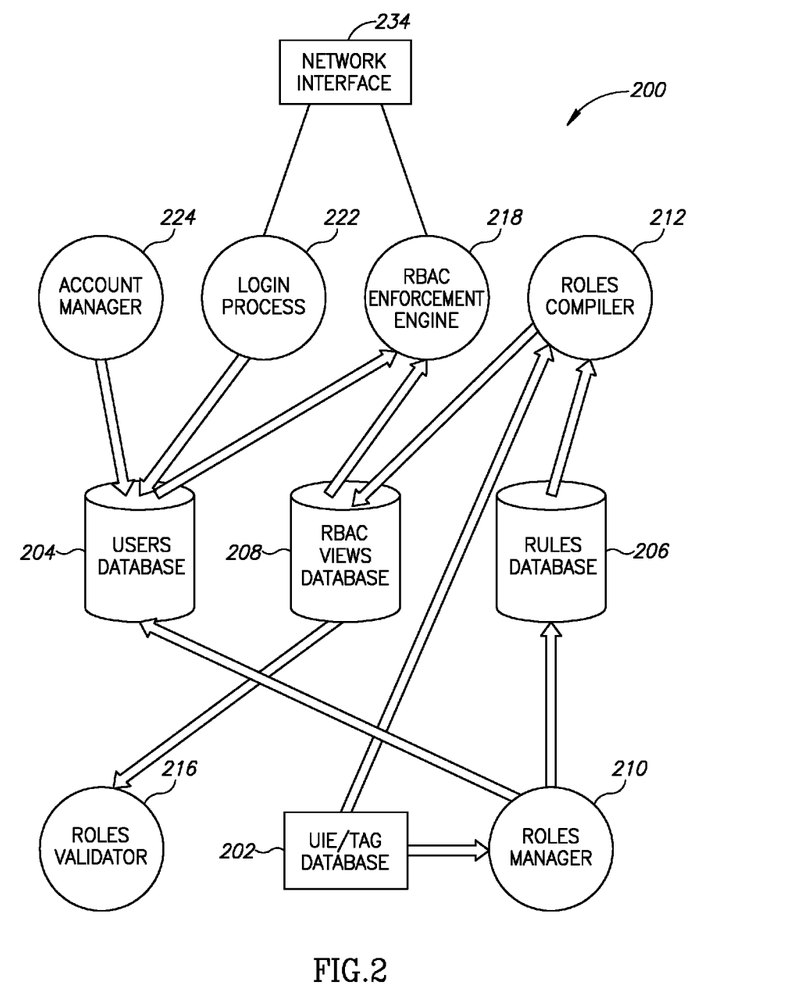
FIG. 2 is a schematic illustration of units of a network management station, in accordance with an exemplary embodiment of the invention.

FIG. 2 is a schematic illustration of units of a network management station 200, in accordance with an exemplary embodiment of the invention. Station 200 includes a user interface element (UIE) database 202 which lists the elements which are controllable by users of network 100, and corresponding tags associated with each of the elements.

In some embodiments of the invention, each element is directly associated with tags. Optionally, in these embodiments, when an element is generated, it is associated with its corresponding one or more tags. Alternatively, each element is associated as belonging to a specific element type and the element types are assigned one or more tags. Optionally, in accordance with this alternative, a set of element types and associated respective tags are defined at a system configuration stage, optionally by a vendor of management station 200. When a new element is generated, the element is merely associated by a human user with an element type and is thus automatically associated with the tags of the element type. In an exemplary embodiment of the invention, the element types depend on the functions of the elements. For example, the element types may include, but are not limited to, an IP station type, a voice mail unit type, a digital trunk type and an analog station type. Optionally, the element types of the elements are defined by a manufacturer of the elements. Additionally or alternatively, a system manager utilizing the element may define or change the element type of an element. In some embodiments of the invention, when a new element is to be associated with a set of tags not defined for any element type, a system manager or other human user may define a new element type. Alternatively or additionally, an element may be defined as belonging to a custom type, and its tags are listed instead of the element type.

In some embodiments of the invention, the set of tags associated with each element type is fixed. Alternatively, a system manager or other user may change the tags associated with an element type, when required.

An exemplary simplified content of UIE database 202 optionally has an element table of the form:

| UIE | Element type |
|---|---|
| UIE-1 | Digital trunk |
| UIE-2 | IP station |
| UIE-3 | Digital trunk |
| UIE-4 | Voice mail unit |
| UIE-5 | Voice mail unit |
| UIE-6 | Custom - Telephony, configuration | and an element type table of the form:

| Element type | Tags | | | |
|---|---|---|---|---|
| IP station | Medium security | IP network | Configuration | |
| Digital trunk | High security | Trunk | | |
| Voice mail unit | Affects single service | Telephony | Maintenance | |

In another exemplary embodiment of the invention, UIE database includes a single table of the form:

| Element | Tags | | | |
|---|---|---|---|---|
| UIE-1 | low security | Low complexity | central management | effects single service |
| UIE-2 | Infrastructure | Proprietary | | |
| UIE-3 | Infrastructure | Entire network impact | | |
| UIE-4 | Users | Single user | High security | |
| UIE-5 | Telephony | High complexity | Central management | Open to all |
| UIE-6 | Services | Low complexity | Non-disruptive | |

It is noted that in some embodiments of the invention the number of tags associated with a specific element may vary according to the nature of the element. For example, some elements may be associated with only one or two tags, while other elements are associated with more than five or possibly more than ten tags. In other embodiments of the invention, all the elements have the same number of tags or the elements have similar numbers of tags.

Station 200 further includes a user database 204, which lists the users allowed to access elements of network 100, and corresponding roles to which each such user belongs. An exemplary portion of user database 204 may have the form:

| User: Abigail | Role: Manager |
|---|---|
| User: Ben | Role: Technician |
| User: Clara | Role: Configuration |
| User: David | Role: Technician |
| User: Elmo | Role: Technician |
| User: Francis | Role: Manager |
| User: Greg | Role: Senior technician |

In some embodiments of the invention, each user is associated with only a single role. Alternatively, the system manager may associate one or more users with a plurality of roles, for example when a user performs two different tasks in a company, and the user is entitled to the access permissions of all the roles.

A rule database 206 includes, for each role, one or more equations which define the permissions of the role as a function of the tags. Alternatively to defining rules only for roles, some or all of the rules in rule database 206 relate to a particular user and not to a role. A role manager 210 is optionally used by a human system manager to define roles and rules in rule database 206. In some embodiments of the invention, role manager 210 also serves to associate elements with tags. Alternatively, UIE database 202 is a static database which is generated along with the software of network 100 and is updated by a programmer of network 100.

Optionally, the rules in rule database 206 may include substantially any logical operator including "and", "or", "nand", "not" and "nor". Use of a "not" condition allows defining of rules allowing access to a UIE only if it is not associated with a tag.

For example, following are several equations which may be used:

Role 1 is allowed read/write access to a UIE if and only if the UIE is associated with tag A and (tag B or tag C).

Role 1 is allowed read only access to a UIE if and only if the UIE is associated with tag A but not with tag C.

Role 3 is allowed read/write access to a UIE if and only if the UIE is associated with (tag B or tag C) and (tag E or tag F or (not tag G))

In some embodiments of the invention, the roles may be defined in a hierarchy such that parent roles in the hierarchy have all the permissions of the child roles. The rules defined for the parent roles will need to cover only those permissions which are allocated to the parent role and not to the child roles.

An exemplary portion of the content of rule database 206 may have the form:

| | Role | Permission | Condition |
|---|---|---|---|
| 1 | Technician | Read only | (Central management OR trunk) and services |
| 2 | Technician | Read/write | Low security AND (low complexity OR medium complexity) |
| 3 | Technician | Read/write | Medium security AND (non-disruptive OR Affects single service) |
| 4 | Senior technician | Read/write | Low security OR (medium security ) AND high complexity |
| 5 | Senior technician | Read only | Telephony |

A role compiler 212 converts the rules in rule database 206, using UIE database 202, into role based access control (RBAC) compliant rules, which are stored in an RBAC views database 208. The RBAC compliant rules in database 208 are used by an RBAC enforcement engine 218, which enforces the rules on users. Compiler 212 converts the tag dependent rules into RBAC compliant rules which do not reference the tags. Optionally, the conversion is automatically performed by compiler 212 without human user intervention.

In some embodiments of the invention, compiler 212 converts the rules into lines in an access table of RBAC database 208, by inserting the Boolean values of the tags from UIE database 202.

For example, if a VIE, referred to herein as VIE-I, is associated with the tags "central management", "effects single service", "low security" and "Low complexity", the first rule in the above rule table will not be met for VIE-I, because it is not associated with the tag "services", but the second rule will be met, because VIE 1 is associated with both the "low security" and the "low complexity" tags, and therefore the Technician role provides read/write access permissions to VIE-I. The third rule is not met by VIE-I, because VIE-1 is not associated with the "medium security" tag, but this has no effect, since the second rule was met. Since rule 4 is met for VIE-I, the senior technician role also has read/write access to VIE-I.

In some embodiments of the invention, RBAC database 208 lists for each role the elements that the users associated with the role are allowed to access. Optionally, database 208 includes a table, an example of which might look like:

| | UIE-1 | UIE-2 | UIE-3 | UIE-4 |
|---|---|---|---|---|
| Role 1 | Read only | Read and write | Blocked | Read only |
| Role 2 | Blocked | Blocked | Read and write | Blocked |
| Role 3 | Blocked | Read only | Blocked | Read only |

Optionally, enforcement engine 218 receives a role/UIE pair for each requested access and accordingly checks in the table whether the access is allowed at all and if so what type of access is allowed.

Alternatively to using a single table with several possible values (e.g., Read Only, Read and Write, Blocked), RBAC database 208 manages a plurality of tables referred to as views, for each separate type of access (e.g., Read Only). This alternative is optionally used in reviewing stand-alone access commands which include a command indicating the specific access required (e.g., get or set commands), such as used in web services and in accordance with SNMP (Simple Network Management Protocol).

A role validator 216 optionally displays information about the rules in database 206; for example, it may display a list of the elements that a role is allowed to access. An account manager 224 may be used by a human system manager to create user accounts and associate them with roles. A login process 222 authenticates users accessing network management station 200, using any method known in the art. Optionally, a network interface 234 receives user requests from remote clients and transfers them to the appropriate unit of management station 200, for handling. Network interface 234 may operate in accordance with any suitable protocol known in the art, such as HTTP or SNMP (simple network management protocol).

Operation Methods

Figure 3:
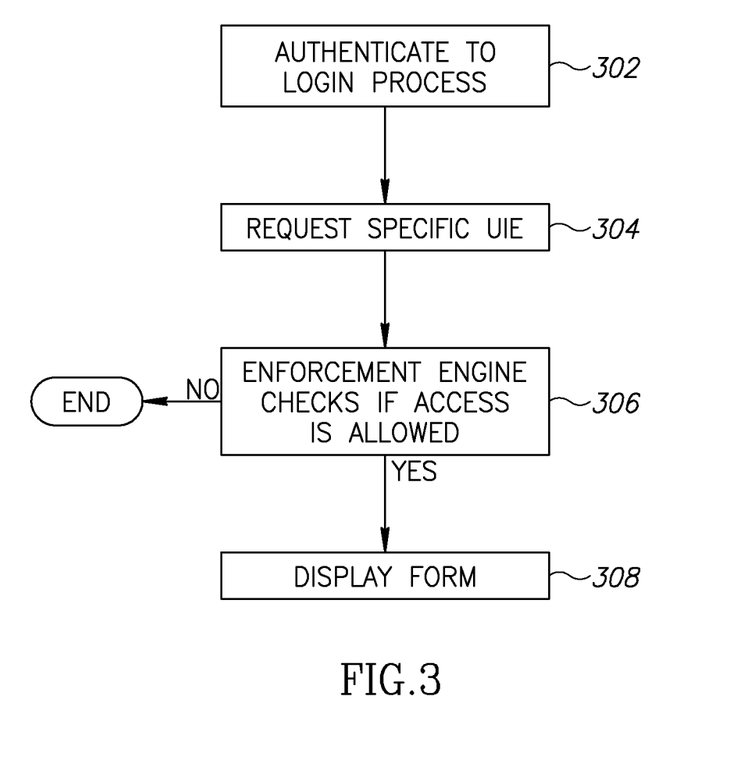
FIG. 3 is a flowchart of acts performed when a user accesses a network management station, in accordance with an exemplary embodiment of the invention.

FIG. 3 is a flowchart of acts performed when a user accesses network management station 200, in accordance with an exemplary embodiment of the invention. In order to access elements of network 100, a user connects to management station 200 and authenticates (302) to login process 222. The user then requests (304) to access a specific UIE. Before management station 200 complies with the request, the request is transferred to an enforcement engine 218, which checks (306) in RBAC views database 208 whether the user is allowed to access the specific UIE. If (306) the access is allowed, management station 200 displays (308) the corresponding form of the UIE to the user. Optionally, the form is modified according to the level of access the user is allowed. For example, if the user is only allowed to read information, fields of the form for accepting information are cancelled (e.g., grayed out). Alternatively or additionally, if the user is allowed to access only some fields, other fields that the user is not allowed to access are grayed out.

Figure 4:
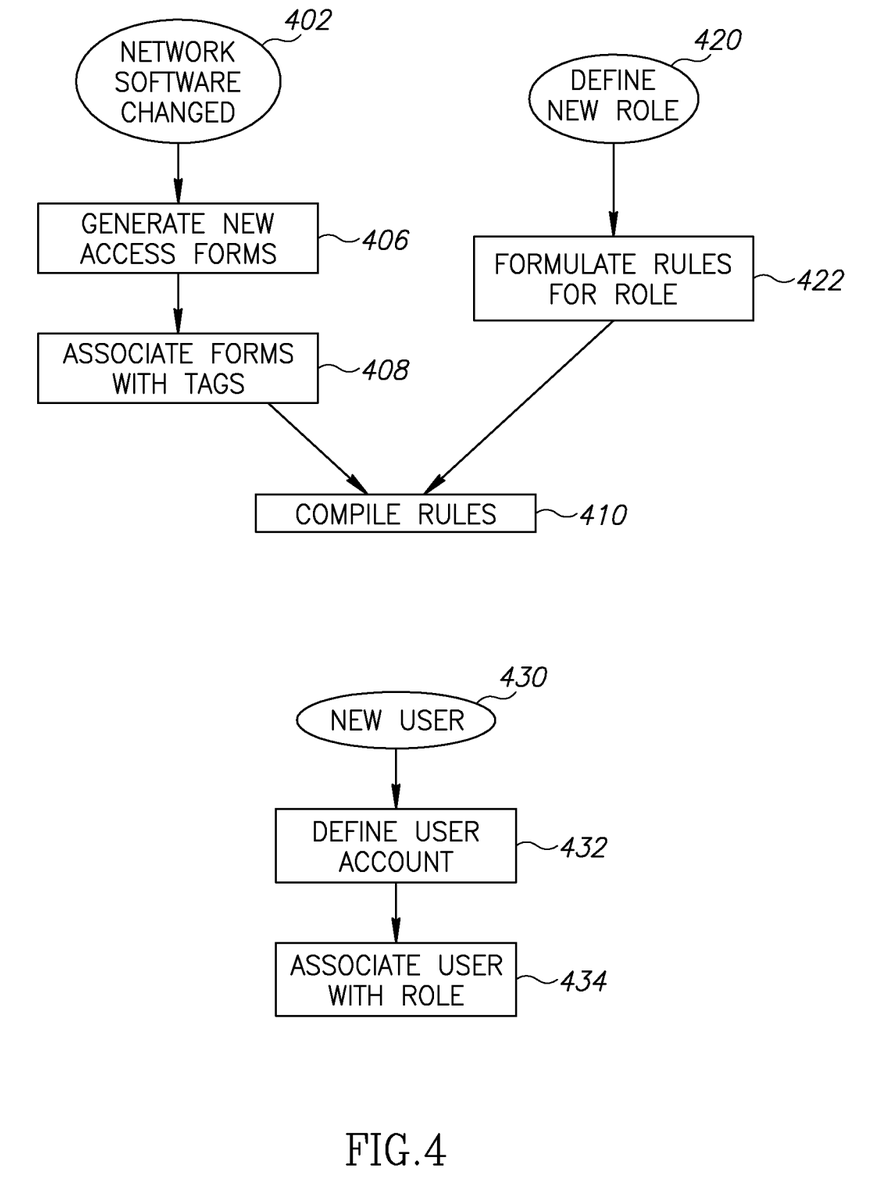
FIG. 4 is a flowchart of acts performed in configuring a management station, in accordance with an exemplary embodiment of the invention.

FIG. 4 is a flowchart of acts performed in configuring management station 200, in accordance with an exemplary embodiment of the invention. When (402) network 100 is changed, for example when a new element is added to network 100 and/or the software of the network is updated, new access forms are generated (406), for example by a programmer, for some or all of the UIEs of network 100. The programmer associates (408) each form with one or more tags which qualify the UIE accessed by the form. The rules in rules database 206 are compiled (410) by roles compiler 212 and the compiled rules are stored in RBAC views database 208.

In defining (420) a new role or amending an existing role, a system manager uses role manager 210 to formulate (422) rule functions that define the access permissions of the role in terms of the tags associated with the forms. The formulated functions are compiled (410) by roles compiler 212 and the compiled rules are stored in RBAC views database 208.

When (430) a new user is to be allowed access to network 100, the system manager uses account manager 224 to define (432) the user account and associate (434) the user with a role. If necessary, a new role is defined (420) for the user and the user is associated (434) with the newly created role. When a role is deleted, the users assigned to the deleted role are assigned different roles.

In some embodiments of the invention, a set of roles is predefined by a vendor of management station 200. Alternatively, the roles are defined by a system manager of network 100. While the above description relates to a system in which roles may be added and/or deleted by a system manager, in some embodiments of the invention, the set of roles is fixed by the vendor of management station 200 and cannot be changed.

Tag Types

Referring in detail to associating (408) forms with the tags, in some embodiments of the invention, a predetermined set of tags is defined for network 100. In associating (408) tags to the UIE, the programmer optionally selects tags from the predetermined set.

In some embodiments of the invention, the tags in the predetermined set include tags relating to the skill level required from technical support people servicing the element interfaced by the form. For example, the predetermined set of tags may include a basic level tag, an intermediate level tag and an advanced level tag. In an exemplary embodiment of the invention, the basic level tag is assigned to UIEs relating to simple tasks such as IP address configuration, the intermediate level tag is assigned to UIEs relating to telephony routing tasks and the advanced level tag is assigned to complex tasks. Tags may also be used to indicate the span of people intended to perform the access. For example, one tag may indicate forms to be accessed only by the vendor of the apparatus, while another tag indicates forms intended for use by other users.

Alternatively or additionally, the predetermined tag set includes one or more secrecy tags relating to the secrecy level of the respective form. For example, forms allowing eavesdropping (e.g., for use by law enforcement personnel) and/or forms allowing password access may have a "high secrecy" tag.

In an exemplary embodiment of the invention, one or more tags in the predetermined set are used to indicate forms relating to maintenance tasks, such as software tests and upgrades; one or more tags are used to indicate forms relating to configuration tasks (e.g., language settings); and/or one or more tags are used to indicate forms relating to monitoring tasks (e.g., log and/or archive management).

Tags relating to the function and/or domain area of the apparatus are optionally also included in the tag set. In a telephony network, these tags may include, for example, "Telephony", "Data", "IP network", "Ethernet", "Trunk", "Line", "Users", "Services", "infrastructure" and the like.

The tag set optionally includes tags for different types of apparatus, such as "computer telephony", "voice mail" and "auto attendant".

In some embodiments of the invention, one or more tags are used to indicate the location from which access is intended, for example whether the form is intended for local access, for access from a central location or both.

The tag set optionally includes one or more tags relating to the extent of effect of a change in the form on the network. For example, a first tag may indicate that the form at most affects a single user, a second tag may indicate that a change in the form at most affects a single service (e.g., voice mail), a third tag may indicate that a change in the form may at most affect a single system of the network and a fourth tag may indicate that the form may disrupt the entire network if improperly changed. Alternatively or additionally, a tag indicating that the form cannot disrupt operation of the network may be used.

While the use of Boolean tags allows simple manipulation, in some embodiments of the invention, tags having numerical or other values, are used. For example, UIEs may be assigned a complexity tag value which indicates its level of complexity, for example on a scale of 1-5. In accordance with these embodiments, the access rules may use inequality conditions, including "greater than", "smaller than", "greater than or equal" and "smaller than or equal".

CONCLUSION

It will be appreciated that the above described methods may be varied in many ways, including changing the order of steps and/or performing a plurality of steps concurrently. It will also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used.

It should be understood that features and/or steps described with respect to one embodiment may sometimes be used with other embodiments and that not all embodiments of the invention have all of the features and/or steps shown in a particular figure or described with respect to one of the specific embodiments.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Variations of embodiments described will occur to persons of the art. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A method of controlling access over a computer network, comprising:
    associating a user interface element associated with a telephony device with at least one tag;
    defining an access permission rule for a client, as a function of one or more tags in the at least one tag, the function including at least one OR, NOT or inequality condition;
    converting the access permission rule for the client into a converted access permission rule for the client relating directly to the user interface element, wherein the converted access permission rule does not reference the one or more tags;
    receiving a request of the client to access the user interface element; and
    allowing the client to access the user interface element only if the request to access the user interface element meets the condition of the converted access permission rule.

2. A method according to claim 1, wherein associating the user interface element with the at least one tag comprises associating the user interface element with at least five tags.

3. A method according to claim 1, wherein associating the user interface element with the at least one tag comprises associating the user interface element with a plurality of tags and wherein defining the access permission rule comprises defining a rule relating to less than all the tags associated with the user interface element.

4. A method according to claim 1, wherein associating the user interface element with the at least one tag comprises associating the user interface element with at least one tag selected from a predetermined closed list of tags defined before the user interface element is generated.

5. A method according to claim 1, wherein associating the user interface element with the at least one tag comprises associating the user interface element with a tag relating to a complexity of an element accessed by the user interface element.

6. A method according to claim 1, wherein associating the user interface element with the at least one tag comprises associating the user interface element with a tag relating to an extent to which the element may disrupt a system controlled by the element.

7. A method according to claim 1, wherein associating the user interface element with the at least one tag comprises associating the user interface element with an element type, which was previously associated with one or more tags.

8. The method according to claim 1, wherein the at least one tag associated with the user interface element is a text string stored in a database.

9. A method of controlling access over a computer network, comprising:
associating a user interface element associated with a telephony device with a plurality of tags;
defining an access permission rule for a client, as a function of one or more tags of the plurality of tags, but not all of the plurality of tags associated with the user interface element;
converting the access permission rule for the client into a converted access permission rule for the client relating directly to the user interface element, wherein the converted access permission rule does not reference the one or more tags;
receiving a request of the client to access the user interface element; and
allowing the client to access the user interface element only if the request to access the user interface element meets the conditions of the converted access permission rule.

10. A method according to claim 9, wherein associating the user interface element with a plurality of tags comprises associating the user interface element with at least four tags.

11. A method according to claim 9, wherein associating the user interface element with a plurality of tags comprises associating the user interface element with at least one tag selected from a predetermined closed list of tags defined before the user interface element is generated.

12. A method according to claim 9, wherein associating the user interface element with a plurality of tags comprises associating the user interface element with at least one tag relating to a complexity of an element accessed by the user interface element.

13. A method according to claim 9, wherein associating the user interface element with a plurality of tags comprises associating the user interface element with a tag relating to an extent to which the element may disrupt a system controlled by the element.

14. A method of controlling access over a computer network, comprising:
associating a user interface element associated with a telephony device with a plurality of tags;
defining access permission rules for a client, as a function of one or more tags;
converting the access permission rules into rules relating directly to the user interface element, by a computer program, wherein the converted access permission rules for the client do not reference the one or more tags;
receiving a request of the client to access the user interface element after converting the access permission rules; and
allowing the client to access the user interface element only if the request to access the user interface element meets the conditions of the converted access permission rule.

15. A method according to claim 14, wherein associating the user interface element with a plurality of tags comprises associating the user interface element with at least four tags.

16. A method according to claim 14, wherein defining the access permission rules comprises defining rules which depend on the tags and do not relate directly to the user interface element.

17. A network management station, comprising:
a network interface;
a memory storing a database associating user interface elements associated with a telephony device with respective lists of one or more tags;
a rule compiler adapted to convert access rules formulated as depending on tags into access rules depending directly on identities of user interface elements, wherein the converted access rules do not reference the one or more tags; and
an access controller adapted to receive access requests to the user interface elements through the network interface and control access by a user responsive to rules generated by the rule compiler.

18. A network management station according to claim 17, wherein the memory stores a database which associates user interface elements with respective element types and associates element types with respective one or more tags.

19. A network management station, comprising:
means for generating user interface elements of network telephony devices;
means for associating the user interface elements with tags;
means for defining access rules for the user interface elements, as a function of their associated tags, which function may include at least one of an OR, NOT or inequality condition;
means for converting the defined access rules into rules relating directly to the user interface elements, wherein the converted access rules do not reference the associated tags;
means for receiving access requests; and
means for preventing access to the user interface elements for requests which do not meet the converted access rules relating directly to a user interface element to which at least one of the access requests relates.

* * * * *